United States Patent [19]
Lortz

[11] 3,982,902
[45] Sept. 28, 1976

[54] IMPLEMENT SUPPORT APPARATUS

[75] Inventor: Russell W. Lortz, Borger, Tex.

[73] Assignee: Phillips Petroleum Company, Bartlesville, Okla.

[22] Filed: Dec. 19, 1974

[21] Appl. No.: 534,284

[52] U.S. Cl. .......................... 23/288 R; 23/288 B; 23/288 S; 23/291; 248/17; 248/324
[51] Int. Cl.² ..................... B01J 8/24; F16M 11/00; F16M 13/00
[58] Field of Search ............... 23/288 S, 288 B, 291, 23/288 R; 248/17, 324

[56] References Cited
UNITED STATES PATENTS

| | | | |
|---|---|---|---|
| 1,989,935 | 2/1935 | Lassiat | 23/288 R |
| 2,108,087 | 2/1938 | Thayer | 23/288 R |
| 2,662,813 | 12/1953 | Packie | 23/288 S |
| 2,690,962 | 10/1954 | Clarke | 23/288 S |
| 2,820,702 | 1/1958 | James | 23/288 R |
| 2,833,632 | 5/1958 | Spitz | 23/288 S |
| 2,888,333 | 5/1959 | Kearns | 23/288 R |
| 2,904,410 | 9/1959 | Trave | 23/288 R |
| 2,934,494 | 4/1960 | Kleiber | 208/161 |
| 2,985,516 | 5/1961 | Trave et al. | 23/288 R |
| 3,460,785 | 8/1969 | Abidi | 248/17 |

FOREIGN PATENTS OR APPLICATIONS

| | | | |
|---|---|---|---|
| 5780/27 | 2/1927 | Australia | 23/291 |

Primary Examiner—Barry S. Richman

[57] ABSTRACT

An implement such as a cyclone is supported in the interior of a vessel such as in a regenerator or a reactor on a fluid catalytic cracking unit in a manner to accommodate heat expansion of various portions of the vessel with a minimal distortion of the vessel and cyclones. The support includes a load-carrying member suspended between an outer portion of the vessel and a plenum which depends within the vessel with the load-carrying member having the cyclones mounted thereon. The free end of the member is connected to the vessel by a pivotable link which allows the member to remain substantially in a plane parallel to its initial position throughout a large temperature change of the vessel which is subject to temperature differences between various portions thereof.

5 Claims, 4 Drawing Figures

IMPLEMENT SUPPORT APPARATUS

The present invention relates to an improved support means for loads which move generally vertically over limited distances. One application of the support means of the present invention is in supporting cyclones in a vessel such as a catalytic cracking reactor or regenerator wherein the cyclones are multistaged and are rigidly connected together. Normal operation of such vessels is conducted at elevated temperatures as, for example, 1,000°F, with the vessel being constructed of various types of material. Because of insulation within the vessel and because of the use of different materials, certain portions of the vessel are subject to different amounts of thermal expansion when the vessel is raised from ambient temperature to operating temperature. In the past, supports have not adequately compensated for the different amounts of thermal expansion. In the present invention, the cyclones are supported from load-carrying members which are positioned in the interior of the vessel and have multipoint support. One point of support is preferably from a position on the vessel shell and another point can be from a plenum which extends into the interior of the vessel. The apparatus of the present invention compensates for the different amounts of expansion and retains the cyclones in a generally vertical position while the load-carrying member remains in a plane which is generally parallel to its initial planar position at ambient temperature. The present apparatus compensates for the different amounts of expansion while being substantially unrestrained thereby reducing stress and strain induced into various components of the vessel.

The principal objects of the present invention are: to provide a support apparatus adapted to be mounted inside a vessel such as a reactor or regenerator for the support of implements therefrom; to provide such a support which will accommodate thermal expansion of various parts of the vessel and be free to expand in a substantially unrestrained condition; to provide such a support apparatus which will remain in a plane substantially parallel to its initial planar position when the vessel is increased from ambient to operating temperature wherein the implements suspended from the support have minimal strain induced therein due to thermal dimensional changes; to provide such support arrangement which will allow the use of different materials for the construction of the vessel and component parts thereof; to provide such a support which is adapted to be mounted in the interior of the vessel; and, to provide such a support which is simple in construction and well adapted for its intended use.

Other objects and advantages of the present invention will become apparent from the following description taken in connection with the accompanying drawings wherein are set forth by way of illustration and example certain embodiments of this invention.

Figure 1:
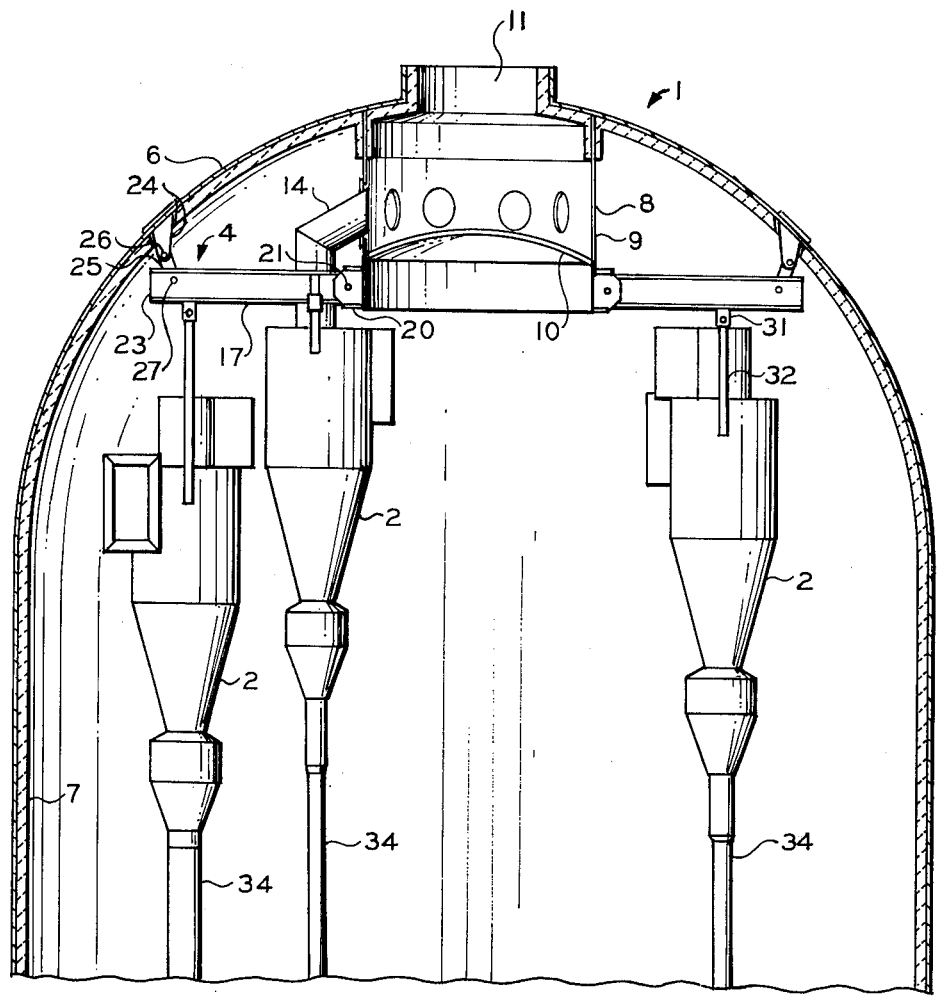
FIG. 1 is a fragmentary elevational view of a vessel having cyclones mounted therein having only selected cyclones illustrated for clarity.
Figure 2:
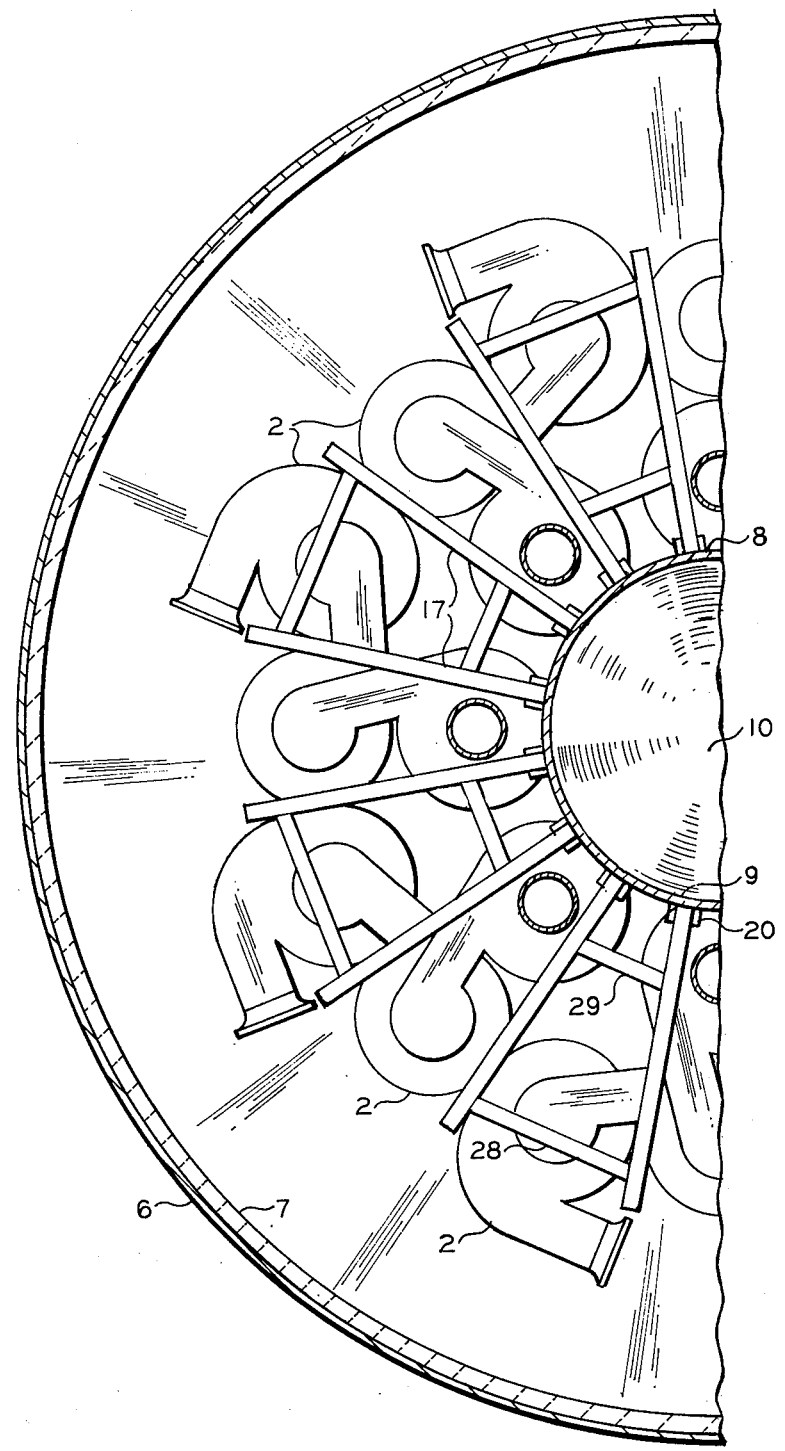
FIG. 2 is a fragmentary sectional view in plan of the vessel with the cyclones suspended therein.
Figure 3:
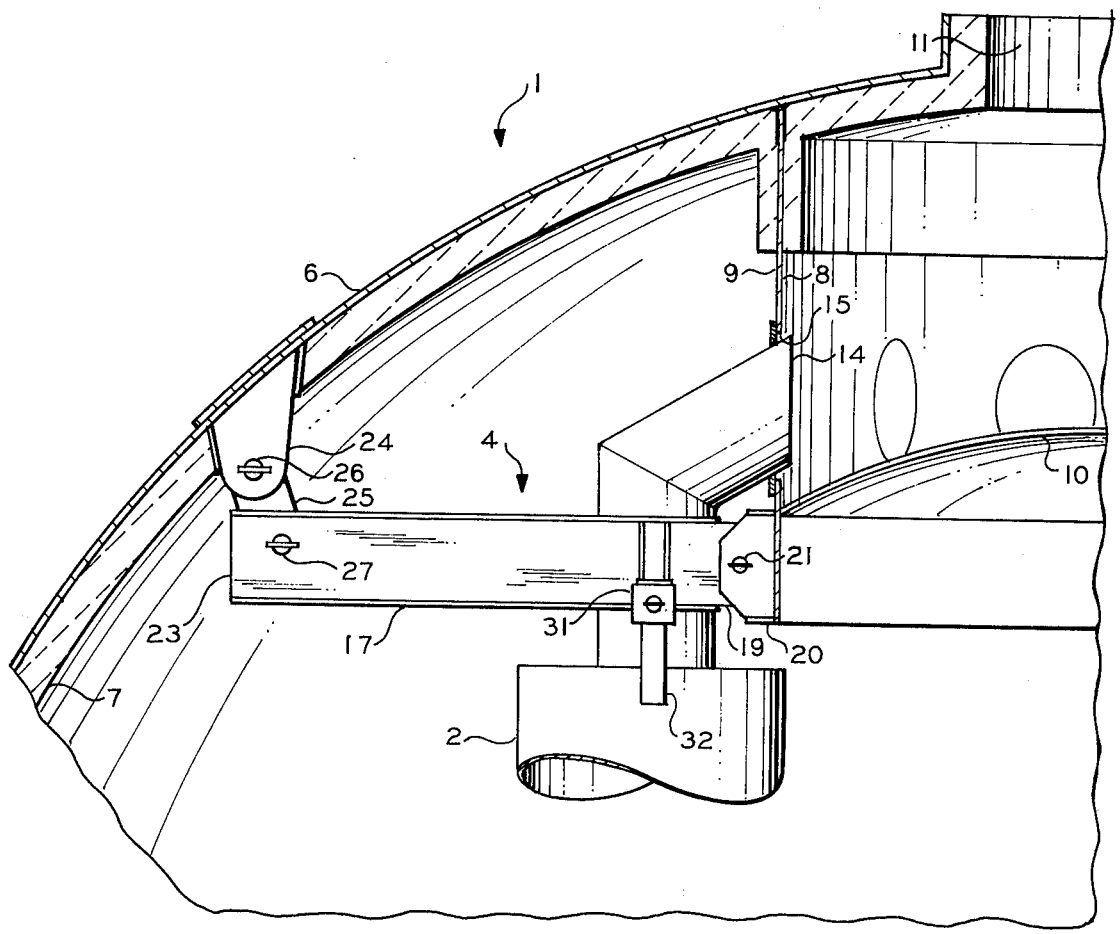
FIG. 3 is an enlarged fragmentary view of the support apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

Referring more in detail to the drawings:

The reference numeral 1 designates generally a vessel such as a catalytic cracking reactor or regenerator having a plurality of implements 2 such as cyclone separators mounted therein. The cyclones 2 are suitably mounted in the vessel 1 by support means 4 which support the cyclones 2 and accommodate temperature changes of the vessel such as an increase from ambient to operating temperature, with a minimum of strain being induced in the vessel 1, cyclones 2 and support means 4.

In the structure illustrated the vessel 1 is comprised of an outer shell 6 and preferably is of a rigid material such as carbon steel and is generally circular in horizontal cross-section having an upper end which is preferably generally dome-shaped. Normally, the vessel 1 is operated at an elevated temperature and to prevent loss of heat and protect the shell 6, the vessel 1 is lined with an insulating layer 7. In the event that the vessel 1 is used as a regenerator or reactor on a catalytic cracking unit, same includes a plenum 8 in the interior thereof. In the form illustrated, the plenum 8 is comprised of a depending tubular portion 9 which is secured to the shell 6 such as by welding. The bottom of the plenum 8 is closed by an end member 10 and the opposite end of the plenum 8 is open as at 11 for a purpose later described. To withstand the elevated operating temperature of the vessel 1 the plenum 8 is preferably made of a strong and rigid material such as stainless steel. The cyclones 2 exhaust into the plenum 8 with the gas escaping through the open end 11. As shown, exhaust members 14 extend through openings 15 through the tubular portion 9 with the exhaust opening into the plenum 8 and are secured such as by welding in their positions extending through the openings 15.

The support means 4 have the cyclones 2 suitably mounted thereon with the support means 4 being of an arrangement which will accommodate thermal expansion of the vessel 1 for reducing strain which would normally be induced from the thermal expansion. In the structure illustrated, support means 4 includes a load-carrying member or beam 17 which is mounted between certain portions of the vessel 1 with at least one end thereof being pivoted and with both ends preferably being in a pivotable relation to various portions of the vessel 1. As shown, the load-carrying member is disposed in a generally horizontal plane. A first end 19 is pivotably mounted to a bracket 20 which is secured to a lower end of the tubular portion 9. As shown, the pivotable relation is provided by a pin 21 having the load-carrying member 17 mounted thereon. The opposite end 23 of the member 17 is suitably suspended from the shell 6. As shown, a bracket 24 is secured to the shell 6 such as by welding and has a portion extending into the interior of the vessel 1. A link 25 is pivotably mounted on the bracket 24 as by a pin 26 and is also pivotably connected to the member 17 adjacent the end 23 as by a pin 27. The link is positioned at an angle relative to the vertical in a manner later described.

Preferably, pairs of load-carrying members are suitably connected together to form rigid support structures. As shown, braces 28 and 29 extend between respective pairs of members 17 and are secured thereto as by welding to form a rigid structure. The members preferably are in diverging relation from the end 19 to the end 23 with the load-carrying members extending generally radially outwardly from the plenum 8. In such an arrangement, it is preferred that the axes of the pins 21 be substantially in axial alignment and the axes of the pins 27 be substantially in axial alignment to permit free pivoting movement of the members 17. The cyclones 2 are suitably suspended from the members 17 and as shown a mounting member 31 is secured to the respective member 17 and has a support member 32 extending therefrom and connected to the cyclones 2 to support same from the members 17. Cyclones 2 are suspended from the member 17 and have discharge conduits 34 depending downwardly therefrom for the discharge of solid material separated from gases by the cyclones 2. The cyclones 2 can be of single or multistage arrangements and as shown same are arranged in triple-stage arrangements wherein one cyclone discharges into a second cyclone which discharges into a third cyclone with the separated solid materials being discharged through the discharge members 34 and the gases being discharged through a respective exhaust 14 into the plenum 8.

Figure 4:
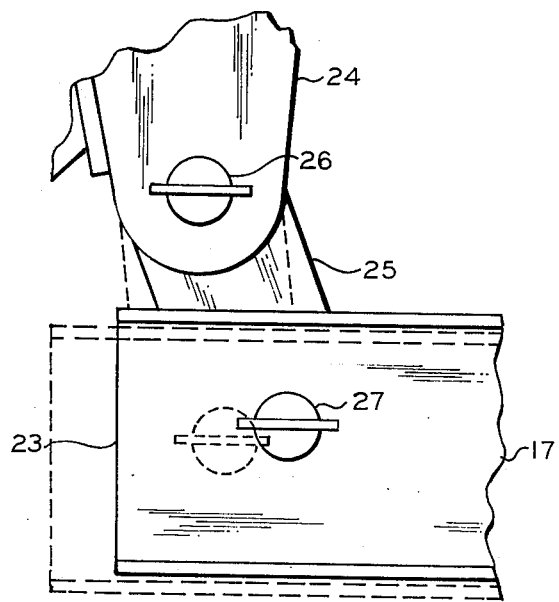
FIG. 4 is an enlarged fragmentary view of a portion of the support apparatus.

It is to be noted that the pivotable link arrangement is shown mounted on the shell 6 but it is to be understood that same can be mounted from the plenum 8 in reverse of that illustrated in the Figures. The present invention is more fully understood by a description of the operation thereof. When the vessel 1 is increased from ambient temperature to operating temperature, such as 1,000°F in the interior thereof, because the shell 6 is protected by a layer of insulation 7 same will not attain as high a temperature as the plenum 8. In addition, the shell 6 and plenum 8 can be of materials having different coefficients of thermal expansion which would effect different amounts of expansion which will be accommodated by the support means 4. As described above, the plenum 8 is of stainless steel and the shell 6 is of carbon steel and because of the different temperatures which same attain during operation of the vessel 1, the plenum 8 would move downwardly relative to the shell 6. During this movement, it is desirable to eliminate or substantially reduce the amount of strain which would normally be induced by rigid support means for the cyclones 2. In the present invention, when the temperature increases the plenum 8 moves downwardly relatively to the shell 6 and the members 17 expand in length. As best seen in FIG. 4, the different expansions will effect pivoting movement of the link 25 which will allow the members 17 to freely expand and move downwardly relative to the shell 6 a distance depending upon the initial angle of the link 25 whereby the members 17 will remain in a plane substantially parallel to the initial plane thereof at ambient temperature whereby the cyclones 2 will remain substantially vertical and minimal stress will be induced in the plenum 8 and shell 6. It is to be noted that by proper selection of the angle of the link 25 various coefficients of thermal expansion of the plenum 8 and shell 6 can be accommodated. For example, if the plenum 8 will not expand as much as the shell 6 the link as seen in FIG. 4 can be positioned on the opposite side of the vertical to accommodate such coefficient of thermal expansion.

It is to be understood that while I have illustrated and described certain forms of my invention, it is not to be limited to the specific form or arrangement of parts herein described and shown.

What I claim and desire to secure by Letters Patent is:

1. Apparatus comprising:
   a. a vessel having an opening in the top thereof;
   b. a plenum attached to the top of said vessel and depending therefrom, said plenum being in communication with said opening;
   c. a bracket secured to said vessel at a point spaced from said plenum;
   d. a beam pivotally secured at one end to said plenum at a point spaced downwardly from the top of said vessel;
   e. a link pivotally secured at one end of said bracket and at the other end to the second end of said beam so that said beam is disposed in a generally horizontal plane;
   f. a cyclone separator;
   g. a support member attached to said beam between the two ends thereof and depending therefrom to support said cyclone separator within said vessel; and
   h. fluid communication means connecting an outlet of said cyclone to said plenum.

2. A catalytic reactor vessel having a support for supporting a cyclone in the interior of the vessel which is subjected an elevated operating temperature, said vessel comprising:
   a. a vessel having an interior and having a first member depending into said interior from an upper portion of said vessel;
   b. a plurality of second members each having first and second ends, said second members each being disposed in a generally horizontal plane with each having said second end pivotally mounted on said first member;
   c. a plurality of brackets secured to portions of said vessel with each being positioned adjacent a first end of a respective said second member;
   d. a plurality of links each pivotally connected to a respective said bracket and a respective said second member adjacent said first end, said links being disposed at an angle relative to the vertical;
   e. a plurality of load-carrying means each secured to a respective said second member; and
   f. a plurality of cyclone separators each mounted on and supported 3. The apparatus of claim 2 wherein said second members are arranged in pairs in spaced-apart relation, and further comprising at least one brace secured to and extending between each pair of said second members securing same in spaced-apart relation.

4. The support as set forth in claim 3 wherein:
   a. said pair of load-carrying members which have said brace secured thereto are in diverging relation from said second ends to said first ends and extend generally radially from said first member which has the second ends pivotally mounted thereon.

5. The apparatus of claim 3 wherein said second members are positioned in diverging relations from the second to the first ends thereof and extend generally radially from said first member.

* * * * *

UNITED STATES PATENT AND TRADEMARK OFFICE
CERTIFICATE OF CORRECTION

PATENT NO. : 3,982,902
DATED : September 28, 1976
INVENTOR(S) : Russell W. Lortz It is certified that error appears in the above-identified patent and that said Letters Patent are hereby corrected as shown below:

Column 4, claim 2, element (f), after "supported" insert --- by a respective said load-carrying means ---.

Signed and Sealed this

Twenty-eighth Day of December 1976

[SEAL]

Attest:

RUTH C. MASON
Attesting Officer

C. MARSHALL DANN
Commissioner of Patents and Trademarks